ARRANGEMENT FOR REDUCING LOCALLY GENERATED RADIO FREQUENCY INTERFERENCE
Filed April 12, 1965
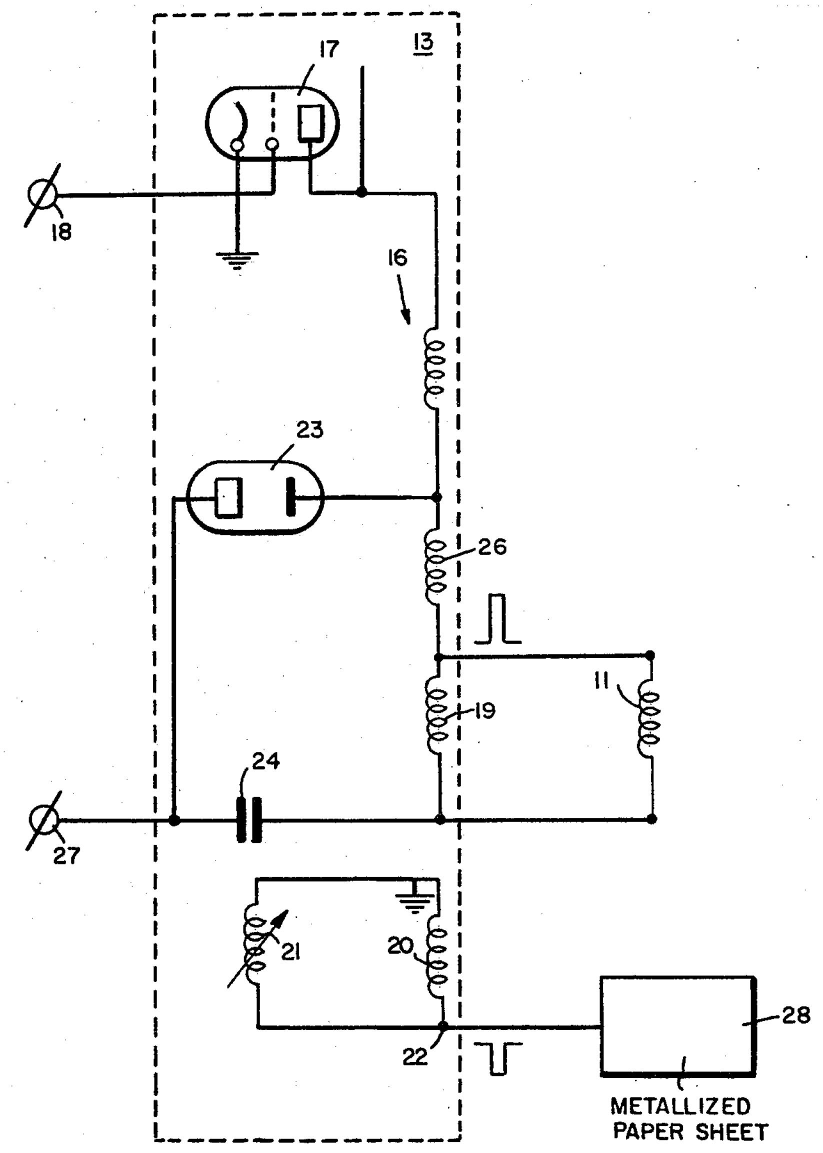
INVENTORS
TEODOR DĂNILĂ
TITUS PLEŞOIANU
GHEORGHE ZAMFIR
BY
Arthur O. Klein
ATTORNEY.

United States Patent Office 3,399,325

Patented Aug. 27, 1968

3,399,325

ARRANGEMENT FOR REDUCING LOCALLY GENERATED RADIO FREQUENCY INTERFERENCE

Dănilă Teodor, bd. Muncii 90; Plesoianu Titus, Str. Drum. Taberei; and Zamfir Gheorghe, Str. St. Velicu 3, all of Bucharest, Rumania Filed Apr. 12, 1965, Ser. No. 447,331

Claims priority, application Rumania, Apr. 21, 1964, 47,840

2 Claims. (Cl. 315—27)

ABSTRACT OF THE DISCLOSURE

An improved arrangement for reducing radiation from an unshielded coil fed by radio frequency pulses from a suitable source is described. An unshielded antenna element adapted to radiate at the frequencies of the spurious radiation is mounted adjacent the coil. The element is excited in phase opposition to the coil from a separate portion of the source. The geometry and the position of the element are chosen so that the amplitude of the radiation from the element is substantially equal to the spurious radiation from the coil.

*Background of the invention*

One problem revelant in television receivers is that of spurious radiation from the unshielded horizontal deflection coil, which is excited with fixed-polarity RF pulses from the output stage of the horizontal sweep circuitry. The bandwidth of the pulse energy (and thus the band of spurious radiation) contains the fundamental horizontal oscillator frequency and harmonics thereof. The spurious radiation emanates outwardly from the receiver and may adversely affect nearby radio receivers and other communication equipment sensitive to the frequencies in the pulse bandwidth.

While it may be possible to shield the coil or, alternately, to employ specially balanced transformers and coils to reduce the level of spurious radiation, such expedients are relatively expensive and/or bulky. Moreover, they frequently must be tailored to be compatible with the particular receiver design with which they are employed.

*Summary of the invention*

A compact, inexpensive and versatile arrangement for eliminating the above-mentioned spurious radiation is provided by the present invention. In a preferred embodiment, an unshielded sheet of metallized paper conductively separate from the coil is mounted adjacent to the coil. The coil is excited by a first wound portion of a transformer. The sheet serves as an antenna element for radiating energy in the spurious frequency band. The sheet is connected to a second wound portion of the transformer conductively separate from and oppositely poled with respect to the first wound portion. The resulting radiation from the sheet is in phase opposition to and tends to cancel the radiation from the adjacent coil. The amplitude of the radiation from the sheet is chosen (e.g., by adjusting the geometry of the sheet) to be substantially equal to the amplitude of the radiation from the coil.

*Brief description of the drawing*

The invention is set forth more fully in the following description when taken in conjunction with the appended drawing, whose single figure depicts schematically an arrangement for reducing RF interference in accordance with the invention.

*Detailed description*

Referring to the drawing, a coil 11, which may represent a deflection coil of the type customarily employed in a television receiver to provide the horizontal line scan, is excited over a pair of leads 12—12 with radio frequency pulses from a suitable source 13. The source 13 may be the output stage of the horizontal sweep portion of the above-mentioned television receiver. Such a stage may include, for example, a transformer 16 having a conventional ferrite core whose designation is omitted from the drawing for purposes of simplicity. The transformer 16 is excited by a horizontal output tube 17, which is driven, via a grid terminal 18, by a horizontal oscillator (not shown). The transformer 16 has a first wound portion 19 for exciting the coil 11 with the above-mentioned pulses, and a second wound portion 20 conductively separate from the first wound portion 19 and oppositely poled with respect thereto for energizing a variable inductance 21 via a terminal 22 to vary the width of the line scan. A suitable damper diode 23 and filter capacitor 24 are serially connected across the coil 11 via a third wound portion 26 of the transformer. An anode terminal 27 of the diode is connected to a suitable source (not shown) of positive voltage.

The pulses applied to the coil 11 from the source 13 have a recurrence frequency which, in the situation assumed, is equal to the frequency of the line scan as established, e.g., by the horizontal oscillator. The coil 11 tends to radiate a portion of the pulse energy applied thereto. The radiation band includes the line scan repetition frequency and its harmonics, including those that commonly cause interference with nearby radio receivers and other communications equipment.

In accordance with the invention a major portion of the RF interference resulting from this spurious radiation may be eliminated by employing compensating radiation from an antenna element 28, which is arranged to radiate in the pulse band. The element 28, which is schematically depicted as a suitably shaped sheet of metallized paper conductively separate from the coil 11, is disposed in the vicinity of the coil 11 (e.g., by suitable nonconductive bonding to the shell of the receiver picture tube). Thus, with respect to surrounding external radio receivers, the radiation from the element 28 and the spurious radiation from the coil appear to emanate from the same place and will add algebraically.

The element 28 is excited from the source 13 in phase opposition to the coil 11. For this purpose, a lead 29 extends between the element and the terminal 22 on the second wound portion 20 of the transformer 16. Since the coil 11 and the element 28 are fed in phase opposition, the radiation from the element tends to cancel the spurious radiation from the coil. The geometry and position of the element may be suitably selected so that the amplitude of its radiation is as nearly equal to the amplitude of the spurious radiation as possible, thereby providing maximum interference suppression. Alternatively, such equalization of radiation amplitude may also be obtained by suitably selecting the number of turns on the second wound portion 20.

In the foregoing, the invention has been described in connection with a preferred arrangement thereof. However, many other modifications will now become obvious to those skilled in the art. Accordingly, it is desired that the breadth of the amended claims not be limited to the specific disclosure herein contained.

We claim:

1. In an arrangement for reducing interference caused by spurious radiation from a deflection coil that is coupled to a first winding of a plural winding horizontal output transformer and excited thereby with signals occupying a predetermined frequency band:

a metallized paper sheet conductively separate from the deflection coil, the sheet being mounted adjacent the coil and adapted to radiate in the predetermined frequency band; and means for coupling the paper sheet to a second winding of the transformer that is conductively separate from and oppositely poled with respect to the first winding.

2. An arrangement as defined in claim 1, in which the geometry and position of the sheet are chosen such that the amplitude of the radiation emitted by the sheet is substantially equal to the amplitude of the spurious radiation.

References Cited

UNITED STATES PATENTS

| | | | |
|---|---|---|---|
| 2,164,906 | 7/1939 | Deserno et al. | 178—7.5 |
| 3,130,370 | 4/1964 | Kondo et al. | 325—436 |

ROBERT L. GRIFFIN, *Primary Examiner.*

R. L. RICHARDSON, *Assistant Examiner.*